Sept. 11, 1934.   G. R. BROOKS   1,973,046
VARIABLE PITCH PROPELLER
Filed May 5, 1930   6 Sheets-Sheet 1

Inventor
Glenn R. Brooks.

Attorney.

Sept. 11, 1934.   G. R. BROOKS   1,973,046
VARIABLE PITCH PROPELLER
Filed May 5, 1930    6 Sheets-Sheet 2

Inventor
Glenn R. Brooks,

Attorney.

Sept. 11, 1934.　　　G. R. BROOKS　　　1,973,046
VARIABLE PITCH PROPELLER
Filed May 5, 1930　　　6 Sheets-Sheet 3

Inventor
Glenn R. Brooks.

Attorney.

Sept. 11, 1934.  G. R. BROOKS  1,973,046

VARIABLE PITCH PROPELLER

Filed May 5, 1930  6 Sheets-Sheet 4

Inventor
Glenn R. Brooks,

Attorney.

Inventor
Glenn R. Brooks.

Attorney.

Patented Sept. 11, 1934

1,973,046

UNITED STATES PATENT OFFICE 1,973,046

VARIABLE PITCH PROPELLER

Glenn R. Brooks, Huntington Park, Calif., assignor of three-tenths to Hugh L. Strickland Application May 5, 1930, Serial No. 449,802

26 Claims. (Cl. 170—163)

This invention relates generally to propellers and more particularly to propellers of the variable pitch type. The invention is described with the particular application to airplanes or other aircraft chiefly in view, although, as will be understood, the invention is equally applicable to propellers or fans as used in many other situations.

The great advantages and utility residing in the application of variable pitch propellers to airplanes or dirigible balloons are well understood in the art and need not here be spoken of at length. It is sufficient here to say that in operating such a propeller the pitch is decreased to give quick gather of speed and also power for climbing, and is increased for traveling at high speed, and also for flying at high altitudes in order to secure more of a bite into the thin air. For the above purposes the propeller is operated through "forward" or "positive" pitches, although the propeller can also be moved past center or neutral to a "reverse" pitch, when the propeller acts as a positive brake.

It is an object of the present invention to provide mechanical means for varying the pitch of the propeller blades, which is of such a nature that the pitch of the propeller can be varied and controlled surely and positively, and to a nice degree of regulation.

It is a further object of the present invention to provide a simple and trustworthy mechanism having few wearing parts, and which is reliable and safe in service.

It is a major characteristic of the present invention that the propeller rotation itself is the source of power for changing the pitch of the blades. To this end there is provided an operating or controlling gear non-rotatably mounted with reference to the propeller hub and adapted to be meshed with a gear mounted in the hub and turning therewith, the latter gear being operatively connected to the base of the propeller blade, which blade is mounted in the hub to be rotatably adjustable about its own longitudinal axis. The rotating hub causes the gear carried thereby and meshing with the stationary controlling gear, to be rotated and thereby to actuate the propeller blade to change its pitch, the two intermeshing gears being moved out of mesh when the propeller blade assumes the desired pitch.

It is another object of the invention to provide means for indicating the pitch of the propeller to aid the operator in adjustment.

It is a further object of the invention to provide means whereby its pitch indicating instrument is automatically interconnected with the propeller for the purpose of reading the pitch thereof by virtue of operating the control device to change the propeller pitch, and to be automatically disconnected when the control device is moved to inoperative position.

These and other features and objects of the invention will appear and be more fully understood from the following detailed description of a present preferred embodiment thereof, reference for this purpose being had to the accompanying drawings, in which:

Referring now to the drawings, and particularly to Figs. 1 to 6 inclusive, the numeral 10 designates the propeller shaft of the engine, the front portion of which is indicated at 11, and the numeral 12 designates generally the propeller hub, which is keyed to shaft 10 as at 13 and is drawn into position thereon by means of a nut 14.

The hub 12 is formed to provide opposed sockets 16, which take the cylindric base sections 17 of the propeller blades 18. Two blades are here shown on the propeller, although it will become apparent that the invention is applicable to propellers or fans having any other number of blades. The cylindric base sections 17 of the propeller blades are rotatably mounted in suitable bearings provided within sockets 16, for instance, there are shown radial bearings 19, and the blade bases are shown provided with enlarged flanges 20 having outwardly facing conical bearing surfaces 21 riding against conical roller bearings 22. The hub 12 is split transversely through the center line of sockets 16, the propeller being assembled by fitting the two parts of the hub around the blade bases and bolting together, as at 24.

The inner end of each blade base 17 extends into the hollow 23 within the hub body and carries therein a worm wheel 26, and meshing with each worm wheel 26 is a worm 27, and worms 27 are mounted on shafts 28 extending rearwardly in hub 12 and journalled in suitable bearings provided therein. The two shafts 28 are parallel to each other, and are on the same side of the propeller shaft 10. This construction may necessitate the use of counterbalancing weights (not shown) on the other side of the propeller shaft 10.

Figures 2, 2A, 5:
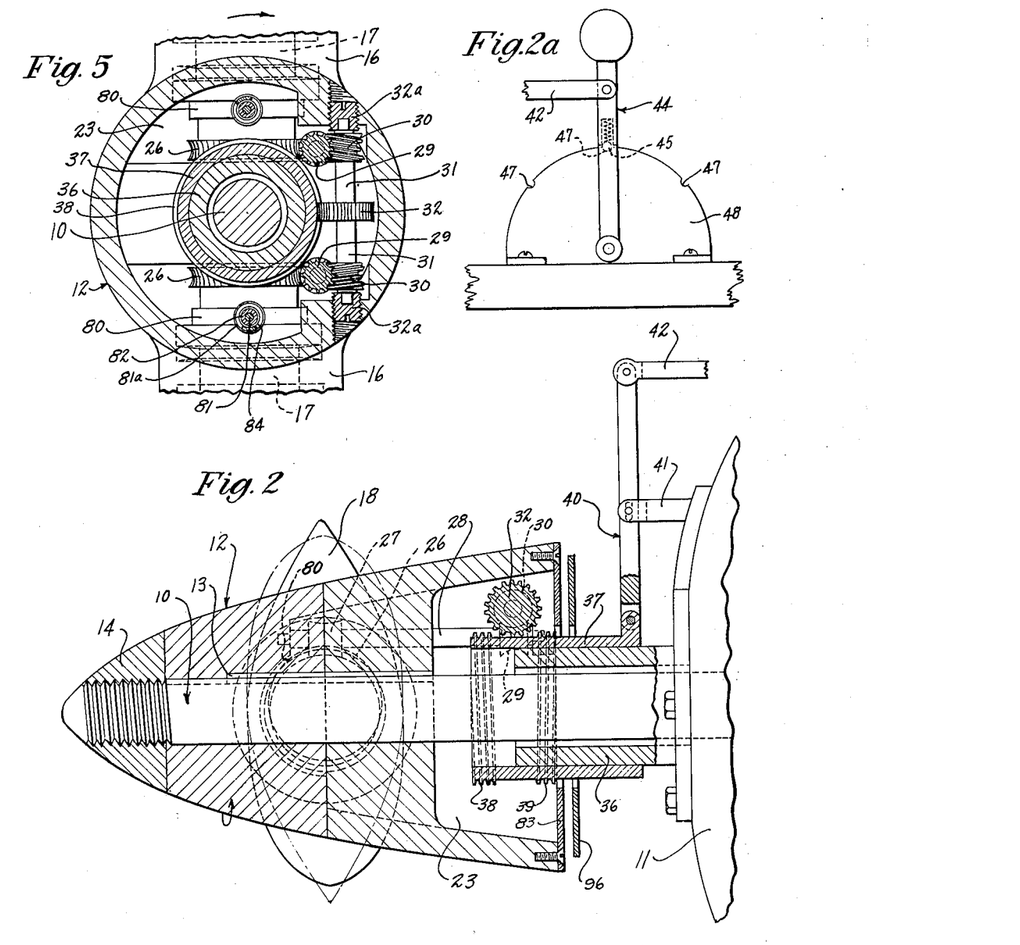
Fig. 2 is a horizontal transverse section taken on line 2—2 of Fig. 1, but showing the propeller blade in neutral position.
Fig. 2a is a view showing an operating lever for the device.
Fig. 5 is a vertical transverse section taken on line 5—5 of Fig. 1.

On the rear ends of shafts 28 are worm wheels 29 that mesh with worms 30 mounted on opposite ends of a cross-shaft 31, shaft 31 being journalled in the hub wall, as at 32a (see Fig. 5). Shaft 31 has, between the two worms 30, a gear 32 through which the shaft 31 is axially rotated for the purpose of driving the two gear trains 30, 29, 27 and 26 to rotate the two blades 18 simultaneously and oppositely on their longitudinal axis and thereby to change the pitch of the propeller. In order properly to operate the two blades to change their pitches in corresponding directions, one of the worms 30 has a right handed pitch and the other has a left handed pitch while all of the other corresponding gears of the two trains have corresponding pitches, and rotation of gear 32 on its axis therefore operates the described gear trains to rotate the two blades in opposite directions on their common longitudinal blade axis, which, it will be understood, amounts to changing the pitch of each blade in the same effective sense or direction. The blades are, of course, so interconnected by the described gears that they reach the plane of zero pitch together (Fig. 2); and from there may be operated to increase through either forward or reverse pitches, depending upon the direction in which gear 32 is rotated. Thus, the pitch of the propeller blades may be either increased or decreased throughout both the forward and reverse pitch ranges by driving gear 32 in the proper direction.

The means for so driving gear 32 will now be described. Surrounding propeller shaft 10 and extending from engine 11 is a stationary, tubular member 36 that forms a slide bearing support for an axially slidable and relatively non-rotatable tubular gear-carrying member 37 that extends into the rear open end of the propeller hub body. This gear member 37 has spaced right handed and left handed spiral or worm gear sections 38 and 39, respectively, either one of which, by longitudinal movement of gear carrying member 37, may be meshed with the blade controlling gear 32. Since gear 32 must thus be adapted for meshing with a right handed and a left handed pitch worm, its gear teeth are cut straight across with no spiral pitch of their own.

The detailed description of the operation of interconnecting gears is given at a later point in the specification, although it may here be noted that when one or the other of the worm gears 38 and 39 are in mesh with the gear 32 (Fig. 3 or Fig. 4), the gear member 37 remaining stationary, the rotation of the propeller hub about the main axis (the axis of gear sections 38 and 39) causes the gear 32 and thus shaft 31 to be rotated and in turn to act through the described gear interconnections to rotate the propeller blades for adjustment on their longitudinal blade axes. When, however, the member 37 is in neutral position, that is, with neither gear 38 or 39 in mesh with the gear 32 (Fig. 2), then gear 32 remains stationary on its axis 31 and the blades are held at their set pitch.

For the purpose of thus operating the gear carrying member 37, there is pivoted to the rear end of member 37 an arm 40 (see Fig. 2), which may be pivotally supported intermediate its ends upon a post 41 extending from the engine, and to the outer end of which is connected an operating link 42. Link 42 extends rearwardly, as shown in Fig. 2a, and may connect with a pivoted operating lever 44. Lever 44 is shown provided with a spring-pressed ball 45 adapted to be taken in the spaced notches 47 of a sector shaped plate 48 for the purpose of accurately setting the lever in any one of the three positions of the gear member 37 illustrated in Figs. 2, 3 and 4.

When lever 44 is set at the center notch, as in Fig. 2a, the gear member 37 is in the neutral position, as in Fig. 2, and the gear 32 is midway between the worms 38 and 39. Assuming the propeller shaft and hub to be rotating, it will be apparent that gear 32 is carried around the member 37 between the worms 38 and 39 thereon, and that the gear 32 has no rotation on its own axis. The gear trains leading from gear 32 to the propeller blades are therefore inoperative and the blades remain at their set pitch. The blades are positively held in this or any set position because the worm gear trains between gear 32 and the blades are of such pitches as to be self locking.

Figure 3:
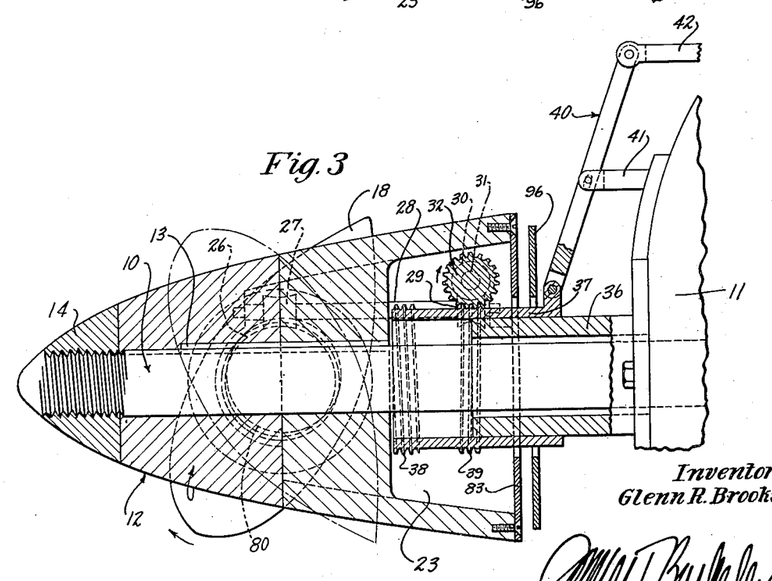
Fig. 3 is a view similar to Fig. 2, but showing the mechanism moved to position to adjust the propeller blades through increasing "positive" pitch.

In Fig. 2 the blades are indicated as being in neutral or zero pitch position, but it will become apparent that when the gear carrying tube 37 is in neutral position with reference to gear 32 the blades will not necessarily also be at neutral, but will be at the position in which they have last been set, which may be at any pitch. It will be assumed for simplicity of explanation, however, that the blades are first in the neutral pitch position, as indicated in Fig. 2. Now to increase the pitch of the blades positively or for forward propulsion, the propeller shaft and the hub being in continuous rotation, lever 44 is shifted rearwardly, which acts through arm 40 to move the gear member 37 forwardly and thereby to move the worm 39, which has the right handed pitch, into mesh with gear 32, as to the position shown in Fig. 3. In meshing worm 39 with gear 32, the gear 32 and shaft 31 simply "roll" on their axes as the worm 39 is moved forwardly against them, the action being apparent when worm 39 is considered as a rack moved longitudinally into mesh with gear 32. When the worm 39 is fully meshed with gear 32, however, it is held stationary, and the gear 32, and shaft in moving around it with the rotating propeller hub, are caused to rotate right handedly on their axes, as indicated in Fig. 3, and accordingly act to transmit motion to the gear trains 30, 29, 27 and 26 leading to the propeller blades, it following that the blades are rotated on their longitudinal axes, as hereinabove described.

When it is determined that the blades have reached the desired pitch, the lever 44 is shifted back to the central or neutral position, which causes the gear member 37 to be rearwardly moved back to the neutral position on Fig. 2, the gear again "rolling" over the worm 39. The blades will then be understood to be in a position such as illustrated in Fig. 3, while the gear members 32 and 39 will be back in the neutral position of Fig. 2.

The gear ratio between the spirals 38 and 39 and the blades should be sufficiently slow even when the propeller shaft is turning over at high speed, that the blades can be set at a desired pitch with nice accuracy. In the specific embodiment shown in the drawings the ratio between the shaft and blade is approximately 14,000 to 1, but this ratio is not essential and may be varied. It is essential, however, that the ratio be sufficient to insure a speed reduction which will give a slow change of pitch while the propeller is in actual operation. The multiplicity of worms (two or more) for each blade employed herein secures the requisite speed reduction to make the device practical and operative. This construction also serves to lock the blade against independent movement. When the blades have reached the desired pitch and during the time that the spiral 38 or 39 is being moved out of mesh with gear 32, the gear 32 may be given some further movement, but at the high gear ratio provided the additional movement given to the blades is negligible. It is found in practice, however, that the spiral gear may be pulled out of mesh with the gear 32 without any further motion being imparted to gear 32, the spiral gear being withdrawn for this purpose just sufficiently fast to allow the gear 32 to "unscrew" from mesh with the spiral.

Figure 4:
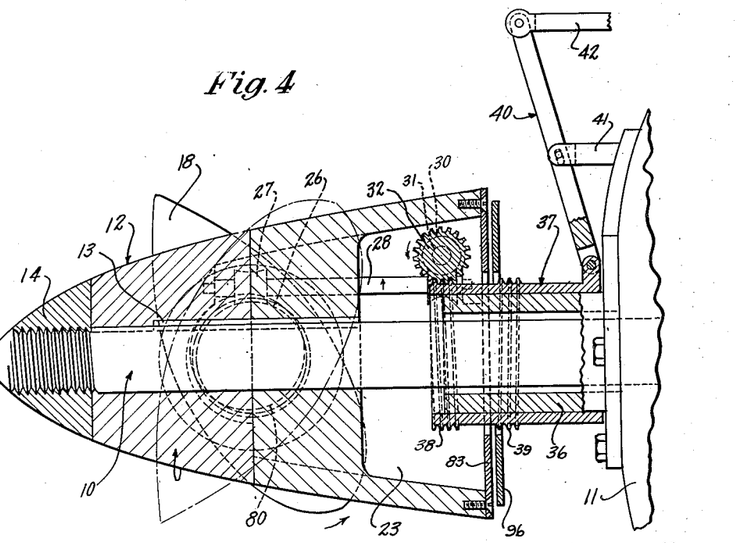
Fig. 4 is a view similar to Fig. 3, but showing the mechanism moved to position to move the propeller blades through increasing "reverse" pitches.
Figure 6:
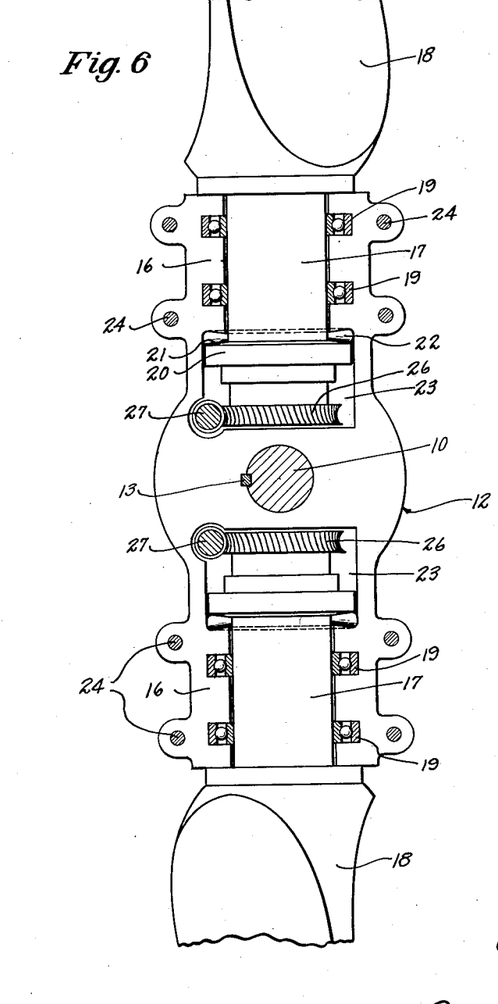
Fig. 6 is a vertical transverse section taken on line 6—6 of Fig. 1.

On the other hand, in case it is required to move the blades from the neutral pitch position of Fig. 2 to a negative or reverse pitch position such as in Fig. 4, lever 44 is shifted forwardly to move the gear member 37 rearwardly and thereby move the worm 38, which has the left handed pitch, into mesh with gear 32. In this case the gear 32 is driven in a left handed direction, as indicated in Fig. 4, and accordingly the blades are moved toward the reverse pitch position of Fig. 4. The lever 44 is, of course, again moved back to the neutral position when the blades have assumed the desired reverse pitch, when the blades will be in such a position as Fig. 4 while the gears are again as shown in Fig. 2.

Now, assuming the blades to be in a positive pitch position, as in Fig. 3, if it is desired further to increase the pitch the lever 44 is actuated to mesh the right handed worm 39 with gear 32 until the desired pitch is reached, while if it is desired to decrease the pitch the lever is actuated to mesh the left handed worm 38 with the gear 32, when the gears will be operated in a reverse direction and the blades will be moved back through decreasing pitch.

Similarly, when the blades are set at a negative or reverse pitch position, as in Fig. 4, the lever may be actuated to throw either worm 38 or 39 into mesh with gear 32 to increase or decrease the pitch.

It will be noted from the drawings that when the gears are in neutral position the left handed worm 38 is ahead of the gear 32 and the right handed worm 39 is to the rear of the gear 32; and by reason of this gear arrangement, if when gear 32 is in mesh with either worm 38 or 39 and the blades should be positively held in any position, such as by a chance jamming of the interconnecting gears, the worm 38 or 39 will screw itself out of mesh with gear 32 and will thus automatically bring the gears back to neutral position. It will also be observed that the engagement or disengagement of the gearing is positive, which is very essential in the practical operation of the device, as the pitch changing devices must be under the positive control of the operator. No frictional devices are employed in the present design, but the actuation of the blade changing means is made through positive mechanical connections.

In Figs. 7 to 10 inclusive, are shown a variational embodiment of the means for driving the gear 32, only the gear 32 of the hub and associated mechanism here being shown since these parts may be substantially similar to those previously described. The object of the embodiment illustrated in these figures is to conserve longitudinal space in cases where the propeller shaft of the engine may not be sufficiently long to accommodate the mechanism of the first described embodiment. In the present case the tubular member 36 is again provided surrounding the propeller shaft 10. The left handed worm 38 is formed on a tubular member 50 longitudinally slidable on member 36, while the right handed worm 39 is formed on a tubular member 51 telescoping over and longitudinally slidable on member 50.

Members 50 and 51 are provided with longitudinal slots 54 and 55, respectively, through which extends a guide pin 56 set into member 36. The end limits of each slot are such as to allow the members 50 and 51 sufficient longitudinal movement just fully to engage and disengage their worms 38 and 39, respectively, with the gear 32. Thus, it will be seen that by moving member 50 rearwardly from the position of Fig. 7 to that of Fig. 9 the worm 38 is meshed with the gear 32, the other gear member 51 remaining stationary; while by moving the member 51 forwardly from the position of Fig. 7 to that of Fig. 10 the worm 39 may be meshed with the gear 32, while the gear member 50 remains stationary. It will be obvious that by thus telescoping the members that carry the two worms a considerable saving in longitudinal space is effected.

For the purpose of operating members 50 and 51, the following provisions may be made. Surrounding member 51 is a rotatable ring member 57 having an operating arm 58, ring 57 carrying a pair of opposed, inwardly extending pins 59 that pass through cam slots 60 and 61 in members 51 and 50, respectively, which are taken at their inner ends by an annular guide groove 63 in the surface of member 36.

Figures 7, 8, 9, 10:
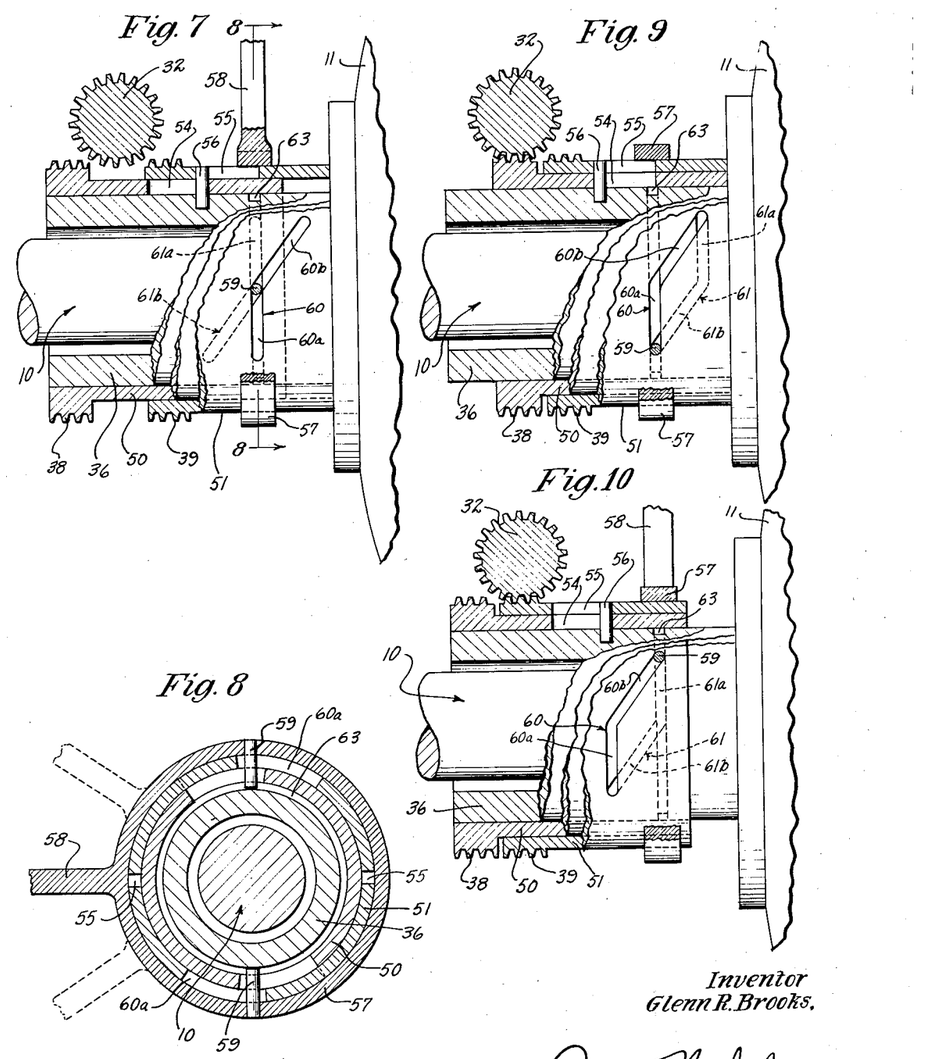
Fig. 7 is a fragmentary view showing a variational embodiment of the invention.
Fig. 8 is a transverse section taken on line 8—8 of Fig. 7.
Fig. 9 is a view similar to that of Fig. 7 but showing the device moved to position to change the pitch of the propeller blades in one direction.
Fig. 10 is a view similar to that of Fig. 7 but showing the device moved to position to change the pitch in the other direction.

Each cam slot 60 of the outside member 51 has a circumferential course 60a and a rearwardly inclined angular course 60b communicating therewith. Assuming the parts to be in the neutral position of Figs. 7 and 8, then rotation of ring 57 to the right, as viewed in Fig. 8, causes the pin to travel down the course 60a, and no movement is imparted to the outside member 51. Rotation of ring 57 to the left, however, causes the pin to travel up the angular course 60b and to coact therewith to move the outside member 51 toward the left, worm 39 being moved into full mesh with gear 32 when the pin has reached the outer end of the slot 60b, as shown in Fig. 10.

Each cam slot 61 of the inside member 50 has a circumferential course 61a that extends oppositely to the corresponding circumferential course 60a of the outside member 51, and has a forwardly inclined, angular course 61b communicating therewith, as clearly shown in the drawings. The parts being in the position of Fig. 7, it will be apparent that rotation of ring 57 to the right, as viewed in Fig. 8, which rotation, it will be remembered, did not impart movement to the outside member 51, causes pin 59 to travel down the angular course 61b of the inside member 50 and to coact therewith to move the member 50 rearwardly toward the position of Fig. 9, worm 38 finally coming into full mesh with gear 32 when pin 59 has reached the outer end of the course 61b. And rotation of ring 57 to the left, which rotation, it will be remembered, caused the outside member 51 to move toward the left in Fig. 10, causes pin 59 to travel up the circumferential course 61a of the member 50, and therefore does not impart movement to member 50.

Thus, rotation of ring 57 in one direction from neutral causes one of the worms to mesh with gear 32 while allowing the other to remain stationary, while rotation of the ring in the other direction causes the other worm to mesh with gear 32 while allowing the first to remain stationary.

Figure 11:
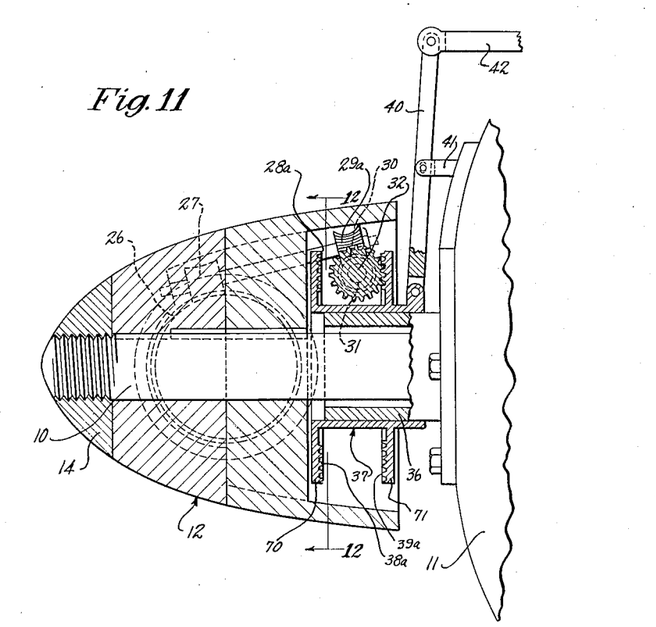
Fig. 11 is a horizontal sectional view showing another variational embodiment of the invention.
Figure 12:
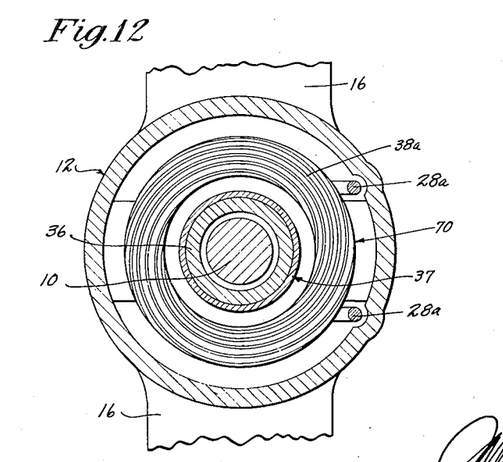
Fig. 12 is a vertical transverse section taken on line 12—12 of Fig. 11.

In Figs. 11 and 12 is shown a further variational embodiment also designed for the purpose of saving longitudinal space when the propeller shaft is not of sufficient length conveniently to accommodate the first described embodiment. In this case there is again provided the gear 32, shaft 31, and worms 30. To accommodate certain parts of the present embodiment, later to be described, the worm wheel 29a with which worm 30 meshes is mounted on the outside of shaft 31, the shaft 28a on which gear 29a is carried extending toward the worm 27 and worm wheel 26 at somewhat of an angle, as indicated in Fig. 11. The tubular mounting member 36 extending from the engine and surrounding the propeller shaft, and the gear carrying member 37 longitudinally slidable thereon are provided as in the first described embodiment. In the present arrangement, however the worms 38 and 39 of the first case are replaced by spiral gears 38a and 39a cut on the opposed faces of disks 70 and 71 extending from member 37 on opposite sides of gear 32, as clearly shown in Figs. 11 and 12. The operation of this embodiment, which is exactly similar to that of the first described arrangement, will be obvious without further explanation, the only difference between the embodiment first described and the present arrangement being in the form of the spiral gears that mesh with gear 32. The great saving in longitudinal space and the attendant advantages residing in the last described arrangement will be obvious.

To enable the operator to read the pitch of the propeller, the following provisions are made. Each blade base 17 has an eccentric 80 against which rides the inner end of a push rod 81 slidably carried in a tubular bearing 82 that extends inwardly into the propeller hub from a ring plate 83 secured at the rear end of the hub body, all as clearly shown in Fig. 1. Encircling bearing 82 and pressing against a flange 81a provided on push rod 81 is a compression spring 84 that constantly urges the push rod into engagement with the eccentric. Rotation of eccentric 80 as the blade is adjusted to position causes longitudinal movement of push rod 81, and the position of the push rod therefore corresponds to the pitch of the propeller.

Figures 1, 13, 14:
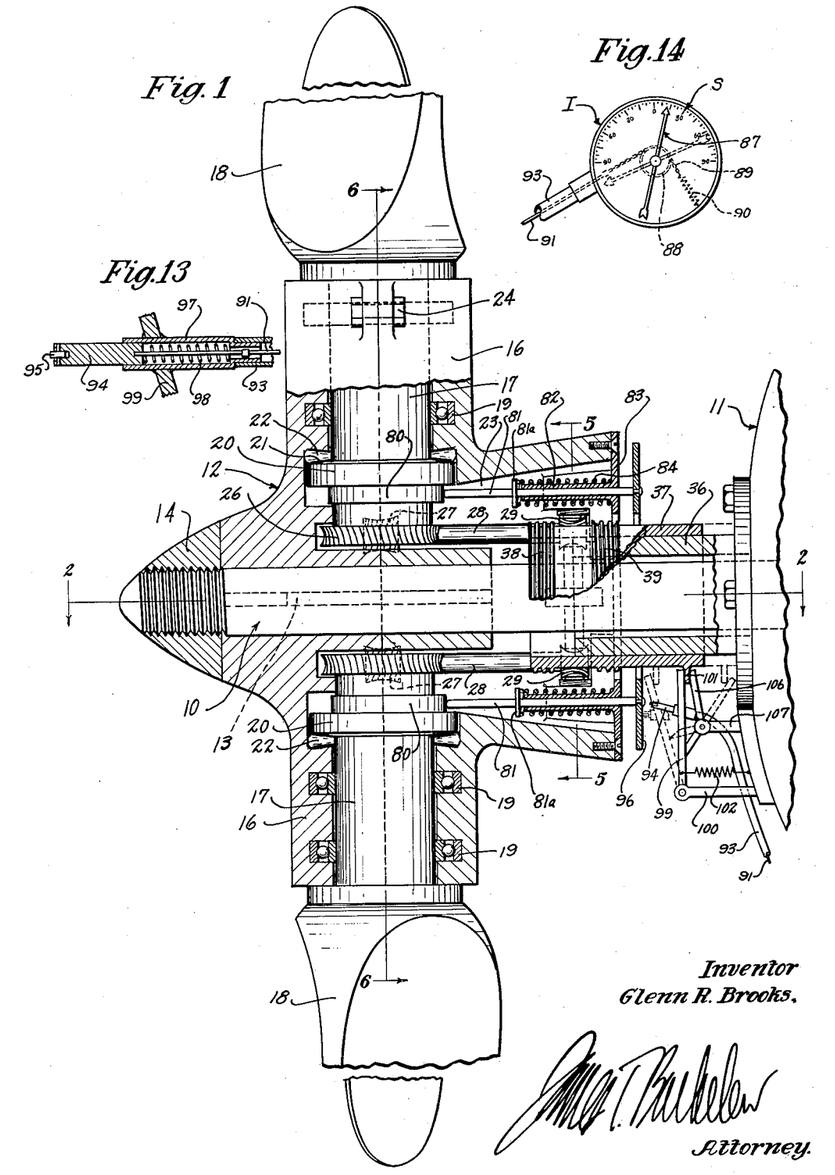
Fig. 1 is a medial vertical section of a present preferred propeller according to the invention.
Fig. 13 is a fragmentary sectional detail taken from Fig. 1.
Fig. 14 designates more or less diagrammatically a pitch indicating instrument.

A pitch indicating instrument is indicated at I in Fig. 14. This instrument may comprise a pivoted indicating hand 87, a sprocket 88 carried thereby, and a chain 89 passing over the sprocket and connected at one end to a tension spring 90, and at the other end to a cable 91 interconnected with the push rod 81 to be actuated thereby.

To interconnect the instrument 1 with the push rods 81, the following provisions may be made. The cable 91 is carried by a guide tube 93, this tube taking the cable to a plunger 94 (see Figs. 1 and 13), having at its outer end a roller 95 that rides, when the plunger is moved to proper position, against the outer surface of a ring 96 carried by the push rod 81. Plunger 94 works longitudinally in a tubular barrel 97 connected to tube 93, a compression spring 98 being provided in the barrel behind the plunger to press outwardly thereon, as clearly shown in Fig. 13. Barrel 97 is shown mounted on an arm 99 pivoted on a post 100 extending from the engine. Provided on the gear carrying member 37 behind the free swinging end of arm 100 is a lug 101 against which the arm is normally rearwardly pulled by a tension spring 102 connected between the arm and the engine. When the parts are in the neutral position of Fig. 1, the barrel 97 and plunger 94 are supported in such a position by the arm 99 that roller 95 clears the rotating ring 96, and the cable 91 is so adjusted that in this position spring 98, which is stronger than spring 90 of the indicating instrument, pulls on the cable to move the indicating hand to an off scale position, as indicated in the dotted lines in Fig. 14. When the gear member 37 is shifted forwardly to mesh its worm 39 with the gear 32, however, the lug 101 of member 37 moves the arm 99 forwardly to the dotted line position shown in Fig. 1, when the roller 95 of plunger 94 is moved into engagement with the ring 96, the position of which is determined by eccentrics 80 and therefore by the pitch of the propeller blades, as previously explained.

When the gear member 37 is moved to such position that its worm 38 is in full mesh with gear 32, it is accurately held in that position, for instance, by virtue of the spring-pressed ball of the operating lever 44 being taken in the proper notch of the sector plate 48. The plunger carrying arm 99 is therefore always brought up to a fixed position when the gear member 37 is shifted forwardly to mesh worm 39 with gear 32, and the compressible spring 98 allows the plunger to take a position with its roller pressed against the ring 96, whatever the position of that ring may be. When plunger 94 is moved rearwardly in its barrel 97 due to contact with ring 96, the cable 91 is allowed to be pulled rearwardly by spring 90 to move hand 87 clockwise to read upon the scale of the instrument, the hand pointing to the center of the scale when the blades are at neutral pitch. In operation, spring 98 causes the plunger 94 to follow the position of the ring 96, which ring is caused by the push-rod springs 84 to follow the position of the eccentrics 80, and the resulting movement of plunger 94 is transmitted through cable 91 to the instrument, which is calibrated to read the pitch of the blades. When the gear member 37 is moved rearwardly to move worm 39 out of mesh with gear 32, the pivoted arm 99 is caused by spring 102 to follow the lug 101 rearwardly to the neutral position, illustrated in full lines in Fig. 1.

On the other hand, when the gear member 37 is moved rearwardly to mesh worm 38 with gear 32, the lug 101 takes with it the upper arm of a lever 106 pivoted upon a post 107 extending from the engine. The lower arm of this lever 106 is arranged just to engage the pivoted arm 99 when arm 99 is in the neutral position, as in the full lines of the Fig. 1. When the upper arm of the lever is moved rearwardly by lug 101 to the dotted line position, the lower lever arm acts against the pivoted arm 99 to move it forwardly to the same operative position as before, as indicated by the dotted lines in the figure, so that the plunger 94 and roller 95 will again come into engagement with ring 96. When the gear member 37 is then moved forwardly back to neutral, lever 106 is released by lug 101 and therefore releases pivoted arm 99, which thereupon returns to its neutral position under the actuation of spring 102 and in doing so acts upon the lower arm of lever 106 to return it also back to neutral. Thus the operation of meshing either worm 38 or worm 39 with gear 32 to adjust the pitch of the blades, causes the pitch indicating instrument and mechanism to be moved to position to register the pitch of the blades as they are being changed. And the pitch indicating instrument and mechanism register the pitch of the blades only when the pitch is being changed, and are inactive at all other times.

While there have been illustrated and described certain specific means for carrying out an embodiment of the invention, it will be obvious that various changes in design, structure and arrangement may be effected without departing from the spirit and scope of the invention; and it is therefore to be understood that all such changes are contemplated within the scope of the invention as expressed in the following claims.

What is claimed is:

1. In combination, a rotating hub, a propeller blade mounted on the hub and adjustable about a longitudinal blade axis, two positive speed reducing gears adapted to intermesh, one mounted on the rotating hub and interconnected with the propeller blade, and the other non-rotatably mounted with reference to the hub axis, and means for moving one of said gears to move the gears into and out of mesh.

2. In combination, a rotating hub, a pair of opposed propeller blades mounted on the hub and each rotatably adjustable about its longitudinal blade axis, two speed reducing gears adapted to positively intermesh, one non-rotatably mounted with reference to the hub axis, and the other mounted on the hub, means for moving one of said gears to move the gears into and out of mesh, and an interconnection between said hub-mounted gear and each of the propeller blades such that the blades are rotated on their longitudinal axes when the two said gears are in mesh.

3. In combination, a rotating hub, a propeller blade mounted on the hub and adjustable about a longitudinal blade axis, a gear mounted on the rotating hub and operatively interconnected with the propeller blade, a pair of oppositely pitched gears non-rotatably mounted with reference to the hub axis, and means for effecting relative movement between either of the last mentioned gears and the hub-mounted gear to move said gears into or out of mesh.

4. In combination, a rotating hub, a propeller blade mounted on the hub and adjustable about a longitudinal blade axis, a spiral gear non-rotatably mounted with reference to the hub axis, a gear adapted to inter-mesh therewith mounted on the hub and interconnected with the propeller blade, and means for moving one of said gears to move said gears into and out of mesh.

5. In combination, a rotating hub, a propeller blade mounted on the hub and adjustable about a longitudinal blade axis, a gear mounted on the rotating hub and operatively interconnected with the propeller blade, a gear carrying member non-rotatably mounted with reference to the hub axis and formed with a pair of oppositely pitched spiral gears, said gears being adapted and mounted to be meshed with the hub-mounted gear, and means for moving said gear carrying member to mesh either of said spiral gears with said hub-mounted gear.

6. In combination, a rotating propeller shaft, a hub mounted thereon, a propeller blade mounted on the hub and adjustable about a longitudinal blade axis, a gear mounted on the rotating hub and operatively interconnected with the propeller blade, a tubular gear carrying member encircling the propeller shaft and mounted longitudinally but non-rotatably movable with reference to the propeller shaft, a spiral gear on said gear carrying member adapted to be meshed with the hub-mounted gear by longitudinal movement of said gear carrying member, and means for longitudinally moving said gear carrying member.

7. In combination, a rotating propeller shaft, a hub mounted thereon, a propeller blade mounted on the hub and adjustable about a longitudinal blade axis, a gear mounted on the rotating hub and operatively interconnected with the propeller blade, a tubular gear carrying member encircling the propeller shaft and mounted longitudinally but non-rotatably movable with reference to the propeller shaft, a pair of spiral gears on said gear carrying member each adapted to be meshed with the hub-mounted gear by longitudinal movement of said gear carrying member, said spiral gears having oppositely pitched teeth, and means for longitudinally moving said gear carrying member.

8. In combination, a rotating propeller shaft, a hub mounted thereon, a propeller blade mounted on the hub and adjustable about a longitudinal blade axis, a gear mounted on the rotating hub and operatively interconnected with the propeller blade, a tubular gear carrying member encircling the propeller shaft and mounted longitudinally but non-rotatably movable with reference to the propeller shaft, a pair of spiral gears on said gear carrying member adapted to intermesh with said hub-mounted gear, said spiral gears having oppositely pitched teeth and one normally located on each side of and out of mesh with said hub-mounted gear, and means for longitudinally moving said gear carrying member to mesh either of said spiral gears with said hub-mounted gear.

9. In combination, a rotating hub, a propeller blade mounted on the hub and adjustable about a longitudinal blade axis, a gear mounted on the rotating hub and operatively interconnected with the propeller blade, a pair of oppositely pitched gears non-rotatably mounted with reference to the hub axis and operating means movable to effect relative movement between either of the last mentioned gears and the hub-mounted gear to move said gears into or out of mesh.

10. In combination, a rotating propeller shaft, a hub mounted thereon, a propeller blade mounted on the hub and adjustable about a longitudinal blade axis, a gear mounted on the rotating hub and operatively interconnected with the propeller blade, a tubular gear carrying member encircling the propeller shaft and mounted longitudinally but non-rotatably movable with reference to the propeller shaft, a pair of spiral gears on said gear carrying member each adapted to be meshed with the hub-mounted gear by longitudinal movement of said gear carrying member, said spiral gears having oppositely pitched teeth, and operating means for longitudinally moving said gear carrying member.

11. In combination, a rotating hub, a propeller blade mounted on the hub and adjustable about a longitudinal blade axis, two gears adapted to positively intermesh, one mounted on the rotating hub and interconnected with the propeller blade and the other non-rotatably mounted with reference to the hub axis and means for relatively moving said gears to move the gears into and out of mesh, said gears being designed so that they will disengage, of themselves, if the propeller can not be changed in pitch.

12. In combination, a rotating hub, a propeller blade mounted on the hub and adjustable about a longitudinal blade axis, two gears adapted to positively intermesh, one mounted on the rotating hub and interconnected with the propeller blade and the other non-rotatably mounted with reference to the hub axis and means for relatively moving said gears to move the gears into and out of mesh, means for normally holding said gears in their engaged position, said holding means being overcome if the propeller cannot be moved whereupon the gears will be returned to their unengaged positions.

13. An adjustable pitch propeller including a propeller shaft, a propeller blade carried by the shaft, and means to rotate the blade upon its axis to vary the pitch thereof during the rotation of the propeller comprising a gear, reduction gearing between and connecting the gear and the propeller, a spiral surrounding the shaft about which the first named gear is movable, and means to engage and disengage the first named gear and the spiral to control the rotation of the blade upon its axis.

14. An adjustable pitch propeller including a propeller shaft, a propeller blade carried by the shaft and means to rotate the blade upon its axis to vary the pitch thereof during the rotation of the propeller comprising a gear, reduction gearing including multiple worms between and connecting the gear and the propeller, a spiral surrounding the shaft about which the first named gear is movable, and means to engage and disengage the first named gear and the spiral to control the rotation of the blade upon its axis.

15. An adjustable pitch propeller including a propeller shaft, a rotatable hub on the shaft, a propeller blade swivelled in the hub and means to turn the blade upon its axis to vary the pitch thereof, said means including a sleeve about the shaft, spaced spirals on the sleeve and a gear connected to the propeller and means to bring a spiral and the gear into mesh, the movement of the gear around the spiral serving to rotate the gear and turn the blade.

16. An adjustable pitch propeller including a propeller shaft, a rotatable hub on the shaft, a propeller blade swivelled in the hub and means to turn the blade upon its axis to vary the pitch thereof, said means including a sleeve about the shaft, spaced spirals on the sleeve, a gear, multiple worms connecting the gear and the propeller, and means to bring a spiral and the gear into mesh, the movement of the gear around the spiral serving to rotate the gear and turn the blade.

17. An adjustable pitch propeller comprising a rotating hub, a blade mounted on the hub and adapted to rotate on its longitudinal axis for pitch variation, and means to rotate the blade by and during the rotation of the propeller, comprising a non-rotating spiral surrounding the shaft, reduction gearing connected to the blade, means to bring the reduction gearing and the spiral into and out of operative connection and means for holding the spiral against rotation when it is disconnected from the reduction gearing.

18. An adjustable pitch propeller comprising a rotating hub, a blade mounted on the hub and adapted to rotate upon its longitudinal axis to effect pitch variation, and means to rotate the blade during the operation of the propeller comprising a multiplicity of worm reduction gearing adapted to be operatively connected to and disconnected from the blade, one of said elements comprising a non-rotating worm and means for holding the non-rotating worm against rotation when it is ineffective to adjust the blade.

19. An adjustable pitch propeller comprising a rotating hub, a blade mounted on the hub and adapted to rotate upon its longitudinal axis to effect pitch variation, and means to rotate the blade during the operation of the propeller comprising a multiplicity of worm reduction gearing adapted to be operatively connected to the blade, the actuating element for said gearing being a worm non-rotatively mounted and surrounding the hub of the propeller and means for holding the last-mentioned worm against rotation when it is ineffective to rotate the blade.

20. An adjustable pitch propeller comprising a rotating hub, a blade mounted on the hub and adapted to rotate upon its longitudinal axis to effect pitch variation, means to rotate the blade during the operation of the propeller comprising a multiplicity of worm reduction gearing adapted to be operatively connected to the blade, the actuating element for said gearing being a worm non-rotatively mounted and surrounding the hub of the propeller, and means to bring the non-rotative worm into and out of operative engagement with the balance of the reduction gearing.

21. In a variable pitch propeller, a shaft, and a blade rotatable upon its axis, a non-rotative spiral surrounding the shaft, gearing connected to the blade and adapted to engage and be activated by the spiral during rotation of the propeller upon its axis and means for holding the spiral against rotation when it is ineffective to operate the gearing.

22. In a controllable pitch propeller the combination of a propeller drive shaft, a hub fixed to rotate with the drive shaft, a plurality of blades rotatable with the hub and mounted therein for rotation on their own axes for pitch variation, and mechanism for varying the pitch of the blades operable by power derived from the rotation of the shaft, comprising a toothed gear carried by the hub and constantly connected to conjointly and positively rotate the plurality of blades for pitch adjustment, a sleeve mounted to move axially of the drive shaft, gear-means between the toothed gear and the sleeve for selectively operating the gear in opposite directions, by rotation of the hub relatively to the sleeve in one direction, controlled by axial movement of the sleeve, and means for shifting the sleeve longitudinally of the shaft into different positions to control the adjustment and the direction of adjustment of the blades.

23. In a controllable pitch propeller the combination of a propeller drive shaft, a hub fixed to rotate with the drive shaft, a plurality of blades rotatable with the hub and mounted therein for rotation on their own axes for pitch variation, and mechanism for varying the pitch of the blades operable by power derived from the rotation of the shaft, comprising a toothed gear carried by the hub and constantly connected to conjointly and positively rotate the plurality of blades for pitch adjustment, a sleeve mounted to move axially of the drive shaft, gear-means between the toothed gear and the sleeve for selectively operating the toothed gear in opposite directions by rotation of the hub relatively to the sleeve in one direction, said gear-means being disconnected from, and adapted to be coupled to rotate, the gear in either direction by axial movement of the sleeve, and means for shifting the sleeve longitudinally of the shaft into different positions to control the operation of, and the direction of movement imparted to the gear by, the gearing.

24. In a controllable pitch propeller the combination of a propeller drive shaft, a hub fixed to rotate with the drive shaft, a plurality of blades rotatable with the hub and mounted therein for rotation on their own axes for pitch variation, and mechanism for varying the pitch of the blades operable by power derived from the rotation of the shaft, comprising a toothed gear carried by the hub and constantly connected to conjointly and positively rotate the plurality of blades for pitch adjustment, a sleeve mounted to move axially of the gear shaft, gear-means between the toothed gear and the sleeve for operating the gear in opposite directions, by rotation of the hub relatively to the sleeve in one direction, controlled by axial movement of the sleeve, means for shifting the sleeve longitudinally of the shaft in different positions to control the adjustment and the direction of adjustment of the blades, and means for holding the sleeve against rotation while it is in position to adjust the blades in either direction.

25. In a controllable pitch propeller the combination of a propeller drive shaft, a hub fixed to rotate with the drive shaft, a plurality of blades rotatable with the hub and mounted therein for rotation on their own axes for pitch variation, and mechanism for varying the pitch of the blades operable by power derived from the rotation of the shaft, comprising worm gears on the blade, respectively, worms meshing with the worm gears, respectively, a toothed gear carried by the hub and constantly connected to conjointly and positively rotate the worm gears for pitch adjustment, a sleeve mounted to move axially of the gear shaft, gear-means between the toothed gear and the sleeve, for operating the gear in opposite directions, by rotation of the hub relatively to the sleeve in one direction, controlled by axial movement of the sleeve, and means for shifting the sleeve longitudinally of the shaft in different positions to control the adjustment and the direction of rotation of the gear.

26. In a controllable pitch propeller the combination of a propeller drive shaft, a hub fixed to rotate with the drive shaft, a plurality of blades rotatable with the hub and mounted therein for rotation on their own axes for pitch variation, and mechanism for varying the pitch of the blades operable by power derived from the rotation of the shaft, comprising a toothed gear carried by the hub and constantly connected to conjointly and positively rotate the plurality of blades for pitch adjustment, a sleeve mounted to move axially of the drive shaft, gear-means between the toothed gear and the sleeve for operating the toothed gear in opposite directions by rotation of the hub relatively to the sleeve in one direction, said gearing being controlled by axial movement of the sleeve, and means for shifting the sleeve longitudinally of the shaft into different positions to control the operation of and the direction of movement imparted to the gear by the gearing, including a ring rotatable on the axis of the shaft and around the sleeve.

GLENN R. BROOKS.